(12) United States Patent  (10) Patent No.: US 7,488,099 B2
Fogg et al.  (45) Date of Patent: Feb. 10, 2009

(54) REARVIEW MIRROR LIGHT (75) Inventors: Jeremy A. Fogg, Holland, MI (US);
 Steven G. Hoek, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 617 days.

(21) Appl. No.: 10/826,047

(22) Filed: Apr. 16, 2004

(65) Prior Publication Data

US 2005/0231969 A1 Oct. 20, 2005

(51) Int. Cl.
 *B60R 1/12* (2006.01)
 *B60Q 1/26* (2006.01)
(52) U.S. Cl. .................... 362/464; 362/492; 359/844
(58) Field of Classification Search .............. 362/249, 362/494, 544, 545, 503, 504, 488, 490, 492; 359/844
 See application file for complete search history.

(56) References Cited

U.S. PATENT DOCUMENTS

| | | | |
|---|---|---|---|
| 4,646,210 A | 2/1987 | Skogler et al. | |
| 4,803,599 A | 2/1989 | Trine et al. | |
| 5,060,027 A | 10/1991 | Hart et al. | |
| 5,113,232 A | 5/1992 | Itoh et al. | |
| 5,151,816 A * | 9/1992 | Varaprasad et al. | 359/275 |
| 5,291,039 A | 3/1994 | Ogata et al. | |
| 5,791,772 A | 8/1998 | Rickfelder et al. | |
| 5,820,245 A | 10/1998 | Desmond et al. | |
| 5,823,654 A * | 10/1998 | Pastrick et al. | 362/494 |
| 5,938,321 A | 8/1999 | Bos et al. | |
| 6,076,948 A | 6/2000 | Bukosky et al. | |
| 6,124,886 A | 9/2000 | DeLine et al. | |
| 6,139,172 A | 10/2000 | Bos et al. | |
| 6,152,590 A * | 11/2000 | Furst et al. | 362/545 |
| 6,200,010 B1 | 3/2001 | Anders | |
| 6,331,066 B1 | 12/2001 | Desmond et al. | |
| 6,407,468 B1 | 6/2002 | LeVesque et al. | |
| 6,441,943 B1 | 8/2002 | Roberts et al. | |
| 6,502,970 B1 * | 1/2003 | Anderson et al. | 362/494 |
| 6,568,839 B1 | 5/2003 | Pastrick et al. | |
| 6,971,775 B2 * | 12/2005 | Lynam et al. | 362/494 |
| 7,008,090 B2 * | 3/2006 | Blank | 362/494 |
| 2002/0126497 A1 | 9/2002 | Pastrick | |
| 2003/0043589 A1 * | 3/2003 | Blank | 362/494 |

* cited by examiner

*Primary Examiner*—John A Ward
(74) *Attorney, Agent, or Firm*—Price, Heneveld, Cooper, DeWitt & Litton, LLP

(57) ABSTRACT

A rearview mirror for a vehicle. The rearview mirror comprises a mirror housing having a bottom opening. A reflective element is located within the mirror housing, with the reflective element being configured to reflect an image having a reflecting component in a first direction out of the mirror housing. A light source is also located within the mirror housing. The light source emits light along a beam axis, with the beam axis having a directional component in a second direction. A deviator is configured to redirect the light emitted from the light source through the bottom opening of the housing. The first direction and the second direction are parallel and opposite.

60 Claims, 7 Drawing Sheets

REARVIEW MIRROR LIGHT

BACKGROUND

The present invention concerns rearview mirrors, and more particularly relates to rearview mirrors having lights.

Rearview mirrors for vehicles include both interior rearview mirrors and exterior rearview mirrors that allow a driver of the vehicle to view objects behind the vehicle. Recently, rearview mirrors have included lights. These lights can include map lights, contour/mood lights and security lights. Map lights typically have an on/off switch allowing the driver and/or passengers of the vehicle to turn the map light on or off. The map light provides sufficient illumination to the driver and/or passengers of the vehicle to read maps and see other items in the passenger compartment of the vehicle. An example of a map light is disclosed in U.S. Pat. No. 6,805,474, entitled VEHICLE LAMP ASSEMBLY WITH HEAT SINK, the entire contents of which are incorporated herein by reference. The contour/mood lights typically illuminate a gear shift and gear panel of an automatic or standard transmission vehicle between two front seats in a vehicle. The contour/mood light is also known as a "PRNDL" light, as the light illuminates a gear panel showing the gear of the vehicle (Park, Reverse, Neutral, Drive or Low). An example of a contour/mood light and a map light is disclosed in U.S. Pat. No. 6,614,579, entitled PROXIMITY SWITCH AND VEHICLE REARVIEW MIRROR ASSEMBLY INCORPORATING THE SAME AND HAVING A TRANSPARENT HOUSING, the entire contents of which are incorporated herein by reference. Furthermore, security lights illuminate when a security system of the vehicle is activated. A security light is also disclosed in U.S. Pat. No. 6,805,474.

Heretofore, rearview mirrors having lights have typically included a housing with a primary circuit board located behind a reflective element in the mirror and a daughter circuit board located in a bottom of the housing. The daughter circuit board is typically connected to the primary circuit board by a jumper wire. The light source is connected to the daughter circuit board and is directed downwardly. The light sources are energized via a control signal from the primary circuit board and the jumper wire to illuminate downward.

However, an improved apparatus is desired having the illumination qualities of the prior rearview mirror lights.

SUMMARY OF THE PRESENT INVENTION

An aspect of the present invention is to provide an interior rearview mirror for a vehicle having a front windshield. The interior rearview mirror comprises a mounting bracket adapted to be mounted inside the vehicle in a location proximate to or on the front windshield of the vehicle. The interior rearview mirror also comprises a mirror housing coupled to the mounting bracket. A reflective element is located within the mirror housing, with the reflective element having a front face defining a reflecting plane. The reflective element is configured to reflect an image having a reflecting component in a first direction out of the mirror housing. A light source is also located within the mirror housing. The light source emits light along a beam axis, with the beam axis having a directional component in a second direction. The first direction and the second direction are perpendicular to the reflecting plane and the first direction is opposite to the second direction.

Another aspect of the present invention is to provide a rearview mirror subassembly comprising a housing having a front opening and a bottom opening. A reflective element is located within the housing, with the reflective element configured to reflect light through the front opening. A light source is also located within the housing. A deviator is configured to redirect the light emitted from the light source through the bottom opening of the housing.

Yet another aspect of the present invention is to provide a rearview mirror for a vehicle. The rearview mirror comprises a mirror housing having a bottom opening. A reflective element is located within the mirror housing, with the reflective element being configured to reflect an image having a reflecting component in a first direction out of the mirror housing. A light source is also located within the mirror housing. The light source emits light along a beam axis, with the beam axis having a directional component in a second direction. A deviator is configured to redirect the light emitted from the light source through the bottom opening of the housing. The first direction and the second direction are parallel and opposite.

Another aspect of the present invention is to provide a rearview mirror subassembly comprising a housing, a reflective element, a printed circuit board and a LED device. The housing has a front opening and a bottom opening. The reflective element is located within the housing, with the reflective element having a front face configured to reflect light through the front opening and a rear face. The printed circuit board includes a first side facing towards the reflective element and a second side facing away from the reflective element. The LED device is directly connected to the second side of the printed circuit board. Light from the LED device exits the housing through the bottom opening in the housing.

These and other aspects, objects, and features of the present invention will be understood and appreciated by those skilled in the art upon studying the following specification, claims, and appended drawings.

DETAILED DESCRIPTION OF PREFERRED EMBODIMENTS

Reference will now be made in detail to the present preferred embodiments of the invention, examples of which are illustrated in the accompanying drawings. Wherever possible, the same reference numerals will be used throughout the drawings to refer to the same or like parts.

Figures 1, 1A:
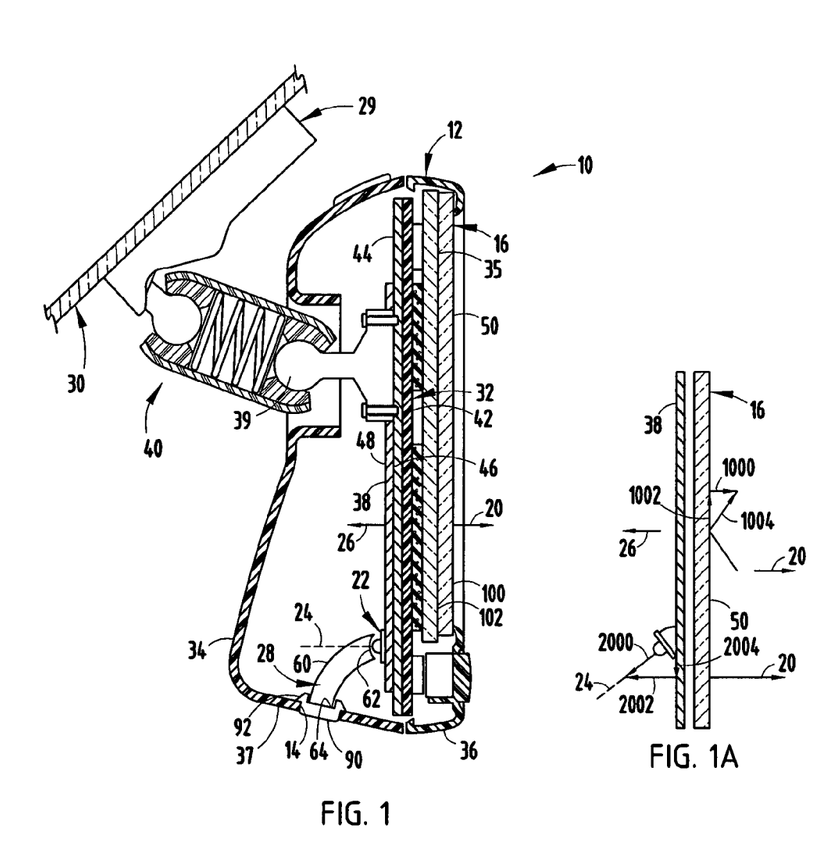
FIG. 1 is a cross-sectional view of an interior rearview mirror of the present invention.
FIG. 1A is a schematic view of a reflective element reflecting light and a light source emitting light according to the present invention.

For purposes of description herein, the terms "upper," "lower," "right," "left," "rear," "front," "vertical," "horizontal," "top," "bottom," and derivatives thereof shall relate to the invention as viewed in FIG. 1. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

The reference number 10 (FIG. 1) generally designates a rearview mirror subassembly for a vehicle embodying the present invention. In the illustrated example, the rearview mirror subassembly 10 comprises a mirror housing 12 having a bottom opening 14. A reflective element 16 is located within the mirror housing 12, with the reflective element 16 being configured to reflect an image having a reflecting component in a first direction 20 out of the mirror housing 12. A light source 22 is also located within the mirror housing 12. The light source 22 emits light along a beam axis 24, with the beam axis 24 having a directional component in a second direction 26. A deviator 28 is configured to redirect the light emitted from the light source 22 through the bottom opening 14 of the housing 12. The first direction 20 and the second direction 26 are parallel and opposite.

The illustrated rearview mirror subassembly 10 of the present invention can be used in an interior rearview mirror or an exterior rearview mirror. When the rearview mirror subassembly 10 is used in an interior rearview mirror, the rearview mirror subassembly 10 is preferably connected to a mounting bracket 29 adapted to be mounted inside the vehicle in a location proximate to or on a front windshield 30 of the vehicle. The interior rearview mirror can have a single ball mount or a double ball mount 40 (FIG. 1). An example of a rearview mirror subassembly connected to a mounting bracket having a single ball mount is disclosed in U.S. Pat. No. 6,467,919 entitled MIRROR WITH SPLIT BALL MOUNT AND HOLD-OPEN DEVICE, the entire contents of which are hereby incorporated herein by reference. An example of a rearview mirror subassembly connected to a mounting bracket having a double ball mount is disclosed in U.S. Pat. No. 5,377,948 entitled BREAKAWAY REARVIEW MIRROR MOUNTING BRACKET, the entire contents of which are hereby incorporated herein by reference. The mounting bracket 29 is connected to the windshield 30 as discussed above and/or a headliner of the vehicle as is well know to those skilled in the art and as disclosed in U.S. Pat. Nos. 6,467,919 and 5,377,948.

In the illustrated example, the housing 12 of the rearview mirror subassembly 10 includes a carrier plate 32 located behind the reflective element 16. The illustrated housing 12 comprises a rear housing section 34 and a bezel 36, with the bottom opening 14 being located in a bottom wall 37 of the rear housing section 34. The bottom opening 14 can include a through hole in the bottom wall 37 of the rear housing section 34 or any translucent or transparent section of the bottom wall 37 of the rear housing section 34 that allows light can propagate therethrough. The carrier plate 32 can include a printed circuit board 38 connected thereto. If the rearview mirror subassembly 10 is used in an interior rearview mirror, the carrier plate 32 is typically fixed in position within the housing 12. The carrier plate 32 of the interior rearview mirror can be used to maintain the position of the reflective element 16 and/or carry the circuit board 38. An example of an interior review mirror including a carrier plate and a circuit board is disclosed in U.S. Pat. No. 6,239,899, entitled MIRROR WITH INTERNAL SUPPORT PLATE, the entire contents of which are hereby incorporated herein by reference. In the interior rearview mirror, the carrier plate 32 assists in maintaining the reflective element 16 in position within the housing 12. The illustrated carrier plate 32 is connected to a first ball 39 of the double ball mount 40. The rear housing section 34, bezel 36, carrier plate 32, printed circuit board 38 and their interconnections are well known to those skilled in the art. An example of a rear housing section, a bezel, a carrier plate, a printed circuit board and their interconnections with a mount is disclosed in U.S. Patent Application Ser. No. 60/536,471 entitled REFLECTIVE ELEMENT HOLDER FOR REARVIEW MIRROR, the entire contents of which are hereby incorporated herein by reference.

In the illustrated example, the circuit board 38 and the reflective element 16 are located adjacent the carrier plate 32. The carrier plate 32 includes a first face 42 facing in the first direction 20 and a second face 44 facing in the second direction 26. The printed circuit board 38 is located adjacent the second face 44 of the carrier plate 32. The printed circuit board 38 includes a first side 46 facing the carrier plate 32 and a second side 48 facing away from the carrier plate 32. The reflective element 16 is located adjacent the first face 42 of the carrier plate 32. In the illustrated embodiment, the light source 22 is connected to the second side 48 of the printed circuit board 38.

The illustrated reflective element 16 of the present invention can comprise an electrochromic (EC) mirror subassembly having a front glass element 100 and a rear glass element 102. The illustrated front glass element 100 and the rear glass element 102 are preferably less than 2.2 mm, or more preferably less than about 1.6 mm down to about 1.1 mm. A more detailed description of reflective elements 16 having glass elements of a thickness of 1.1 mm is disclosed in U.S. Pat. No. 6,195,194 entitled LIGHTWEIGHT ELECTROCHROMIC MIRROR, the entire contents of which are hereby incorporated herein by reference. In the illustrated embodiment, the reflective element 16 is in an interior rearview mirror and therefore has a reflectance value of about 70 percent or greater.

The illustrated reflective element 16 includes an electrochromic (EC) material 35 positioned between the front glass element 100 and the rear glass element 102. Furthermore, a reflector material is preferably located on either the front surface or the rear surface of the rear glass element 102, depending upon the type of the mirror subassembly. The EC material 35 is preferably a solution phase (sometimes called herein a "liquid-phase" or "gel-type") EC material, as disclosed in U.S. Pat. No. 4,902,108 entitled SINGLE-COMPARTMENT, SELF-ERASING, SOLUTION-PHASE ELECTROCHROMIC DEVICES, SOLUTIONS FOR USE THEREIN, AND USES THEREOF and U.S. Pat. No. 5,278,693 entitled TINTED SOLUTION-PHASE ELECTROCHROMIC MIRRORS, the entire contents of both of which are hereby incorporated herein by reference. In addition, a hybrid system where part of the electrochromic medium is solid-state and part is solution phase is also contemplated. Solution-phase materials, because of their liquidic or flowable properties, do not rigidly bond the front glass element 100 and the rear glass element 102 together like a completely solid-state EC medium. As a result, the stiffness of the reflective element 16 using 1.1 mm thick glass elements and a solution-phase EC material is more flexible than an EC mirror subassembly having 1.1 mm thick glass elements and a solid-state phase EC material because, in the reflective element 16 having solid-state phase EC material, the thick glass elements are bonded together in a manner that causes them to bend much like a single glass element having their total thickness. Contrastingly, the reflective element 16 with the solution phase EC material bends in a complex manner wherein the thin glass elements bend simultaneously but independently and separately and wherein the solution phase EC material ebbs and flows somewhat in reaction to the stress. The net result is that the mirror subassembly with solution phase EC material tends to be more flexible and concurrently more sensitive to impact than the mirror subassembly with solid-state phase EC material, even where the front and rear glass elements have the same thickness and other properties. Although the reflective element 16 is illustrated as including the EC material 35, it is contemplated that the reflective element 16 could any type of reflective surface. For example, the reflective element 16 could be a prismatic mirror.

As used herein, the term "light source" 22 includes those light sources that emit optical radiation, which includes visible light, near infrared (IR) radiation, and/or ultraviolet (UV) radiation. The light source 22 may include electroluminescent sources or other solid-state sources and/or photoluminescent or other sources. Suitable electroluminescent sources can include semiconductor optical radiation emitting components. For purposes of the present invention, "semiconductor optical radiation emitting components" comprise any semiconductor material that emits electromagnetic radiation having a wavelength between 100 nm and 2000 nm by the physical mechanism of electroluminescence, upon passage of electrical current through the component or material. The principle function of a semiconductor optical radiation emitting component within the present invention is the conversion of conducted electrical power to radiated optical power. A semiconductor optical radiation component may include a typical IR, visible or UV light emitting diode (LED) chip or die well known in the art and used in a wide variety of prior art devices, or it may include any alternate form of semiconductor optical radiation emitting components as described below.

Alternate forms of semiconductor optical radiation emitting components which may be used in the present invention are light emitting polymers (LEPs), polymer light emitting diodes (PLEDs), organic light emitting diodes (OLEDs), and the like. Such materials and opto-electronic structures made from them are electrically similar to traditional inorganic LEDs, but rely on organic compositions such as derivatives of the conductive polymer polyaniline for electroluminescence. Such semiconductor optical radiation emitting components are relatively new, but may be obtained from sources such as Cambridge Display Technology, Ltd. of Cambridge, and from Uniax of Santa Barbara, Calif.

For brevity, the term semiconductor optical radiation emitting component may be substituted with the term LED or the alternate forms of emitting components described above or known in the art. Examples of semiconductor components suitable for the present invention include varieties of LED chips with associated conductive vias and pads for electrical attachment and that are emissive principally at P-N or N-P junctions within doped inorganic compounds of AlGaAs, AlInGaP, GaAs, GaP, InGaN, AlInGaN, GaN, SiC, ZnSe and the like.

LEDs are a preferred electroluminescent light source for use in the light sources of the present invention because LEDs do not suffer appreciable reliability or field-service life degradation when mechanically or electronically switched on and off for millions of cycles. The luminous intensity and illuminance from LEDs closely approximates a linear response function with respect to applied electrical current over a broad range of conditions, making control of their intensity a relatively simple matter. Finally, recent generations of AlInGaP, AlGaAs, InGaN, AlInGaN, and GaN LEDs draw less electrical power per lumen or candela of visible light produced than incandescent lamps, resulting in more cost-effective, compact, and lightweight illuminator wiring harnesses, fuses, connectors, batteries, generators, alternators, switches, electronic controls, and optics.

Another preferred radiation source that may be used in the inventive light emitting assembly is a photoluminescent source. Photoluminescent sources produce visible light by partially absorbing visible or invisible radiation and re-emitting visible radiation. Photoluminescent sources are phosphorescent and fluorescent materials, which include fluorescent dyes, pigments, crystals, substrates, coatings, as well as phosphors. Such a fluorescent or phosphorescent material may be excited by an LED or other radiation emitter and may be disposed within or on an LED device, or within or on a separate optical element, such as a lens or diffuser that is not integral with an LED device. Exemplary structures using a fluorescent or phosphorescent source are disclosed in commonly assigned U.S. patent application Ser. No. 09/723675 entitled "LIGHT EMITTING ASSEMBLY," filed on Nov. 28, 2000, by Turnbull et al., the entire disclosure of which is hereby incorporated herein by reference.

In the illustrated example, the reflective element 16 reflects light 1004 which has a reflecting component 1000 in the first direction 20. As illustrated in FIGS. 1 and 1A, the reflective element 16 has a front face 50 defining a reflecting plane. The reflective element 16 is configured to reflect light away from the front face 50, with the reflected light having the reflecting component 1000 in the first direction 20. All light reflected off of the reflective element 16 will have the reflecting component 1000 in the first direction 20 and a propagation component 1002 along the reflecting plane. For example, light contacting the reflecting plane at a ninety degree angle will substantially reflect at a ninety degree angle to the reflecting plane, wherein the reflecting component 1000 is 100% of the reflection and the propagation component 1002 is 0% of the reflection. Likewise, light contacting the reflecting plane at a forty-five degree angle will substantially reflect at a forty-five degree angle to the reflecting plane, wherein the reflecting component 1000 is 50% of the reflection and the propagation component 1002 is 50% of the reflection. While the light reflecting off of the front face of the reflective element 16 may only reflect at a very small angle in relation to the reflecting plane, the reflected light will have the reflecting component in the first direction.

The illustrated light source 22 emits optical radiation along the beam axis 24, which has a direction component in the second direction 26. As discussed above, the first direction 20 and the second direction 26 are parallel and opposite. Therefore, the second direction 26 is also perpendicular to the reflecting plane. As illustrated in FIG. 1A, the light 2000 emitted from the light source 22 will have a first direction component 2002 in the second direction 26 and a second direction component 2004 along the reflecting plane. For example, if the light source 22 is directed along the second direction 26, the first direction component 2002 will be 100% of the direction of the propagation of the light and the second direction component 204 will be 0% of the direction of the propagation of the light. Likewise, if the light source 22 is angled at 45° relative to the reflecting plane, the first direction component 2002 will be 50% of the direction of the propagation of the light and the second direction component 2004 will be 50% of the direction of the propagation of the light. While the light emitted from the light source 22 may only emit light at a very small angle relative to the reflecting plane, the light will have the direction component in the second direction 26.

The interior rearview mirror subassembly 10 of the present invention allows the light source 22 to be connected to the printed circuit board 38 and direct light out of the bottom opening 14 of the housing 12 without the need for a daughter circuit board connected to the printed circuit board 38. Since the light source 22 is connected to the printed circuit board 38 in the illustrated embodiment, the beam axis 24 of the light emitted from the light source has the directional component in the second direction 26. In one embodiment of the present invention, the beam axis 24 is angled within about 45% relative to the second direction 26.

In the illustrated embodiment, the deviator 28 redirects the light emitted from the light source 22 through the bottom opening 14 of the housing 12. In a first embodiment of the present invention, the deviator 28 comprises a light pipe 60. The light pipe 60 includes a first end 62 adjacent the light source 22 and a second end 64 adjacent the bottom opening 14. The light pipe 60 accepts the light emitted from the light source 22 in the first end 62 and redirects the light to the second end 64 and out through the bottom opening 14 of the housing 12. The light pipe 60 reflects the light internally as is well known to those skilled in the art. It is contemplated that the light pipe 60 can include a metalized reflector for internally reflecting the light therein. Preferably, the deviator 28 reflects the light emitted from the light source 22 at an angle of between 45° and 135°.

Figure 2:
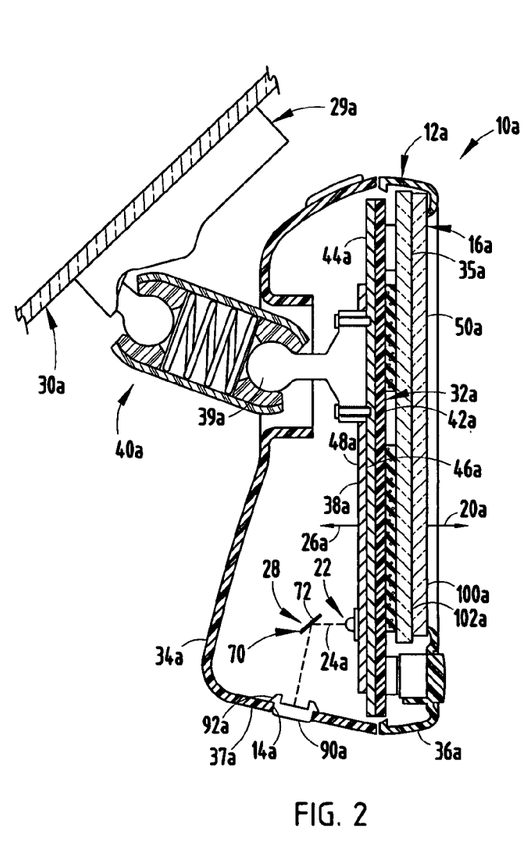
FIG. 2 is a cross-sectional view of an interior rearview mirror of a second embodiment of the present invention.

The reference numeral 10a (FIG. 2) generally designates another embodiment of the present invention, having a second embodiment for the rearview mirror subassembly. Since the second embodiment of the rearview mirror subassembly 10a is similar to the previously described rearview mirror subassembly, similar parts appearing in FIG. 1 and FIG. 2, respectively, are represented by the same, corresponding reference number, except for the suffix "a" in the numerals of the latter. The second embodiment of the rearview mirror subassembly is substantially identical to the first embodiment of the rearview mirror subassembly, except that the deviator 28a comprises a reflector element 70. In the illustrated example, the reflector element 70 comprises a mirror 72. Furthermore, the mirror 72 is illustrated as being planar. However, it is contemplated that the mirror 72 could be convex, concave or have any surface configuration. In the second embodiment of the rearview mirror subassembly, the light emitted from the light source 22 is propagated along the beam axis 24a until the light hits the mirror 72, whereby the light is reflected off of the mirror 72 and redirected towards the bottom opening 14a.

The light emitted from the light source 22 of the present invention can be used as a map light, a contour/mood light and/or a security light. For example, the light source 22 can be used as a map light to selectively illuminate a portion of the interior of the vehicle. Accordingly, the light source 22 could be connected to a button (not shown) or other actuation device that would activate the light source 22 to thereby direct light out of the bottom opening 14 in the housing 12. Furthermore, the light source 22 can be used as a contour/mood light to illuminate the interior of the vehicle. The contour/mood light could be illuminated constantly or could be automatically illuminated when a sensor in the rearview mirror or interconnected thereto senses that ambient light in the vehicle has fallen below a certain level. Additionally, it is contemplated that the map light and the contour/mood light could comprise light emitted from one light source 22, with the light source 22 emitting light at a higher illumination when the map light is activated. An example of a contour/mood light and a map light is disclosed in U.S. Pat. No. 6,614,579, entitled PROXIMITY SWITCH AND VEHICLE REARVIEW MIRROR ASSEMBLY INCORPORATING THE SAME AND HAVING A TRANSPARENT HOUSING, the entire contents of which are incorporated herein by reference. Moreover, the light source 22 could be used as a security light that lights when a security system of the vehicle is activated. A security light is disclosed in U.S. Pat. No. 6,805,474, entitled VEHICLE LAMP ASSEMBLY WITH HEAT SINK, the entire contents of which are incorporated herein by reference. When the security light is employed, the bottom opening 14 preferably includes a red diffuser and/or lens.

Figure 2A:
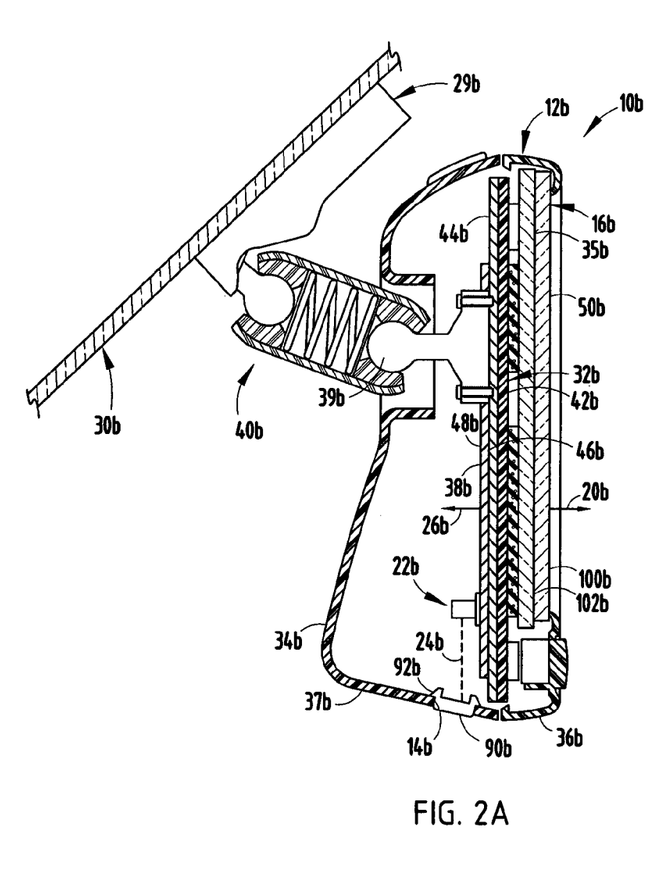
FIG. 2A is a cross-sectional view of an interior rearview mirror of a third embodiment of the present invention.
Figure 2B:
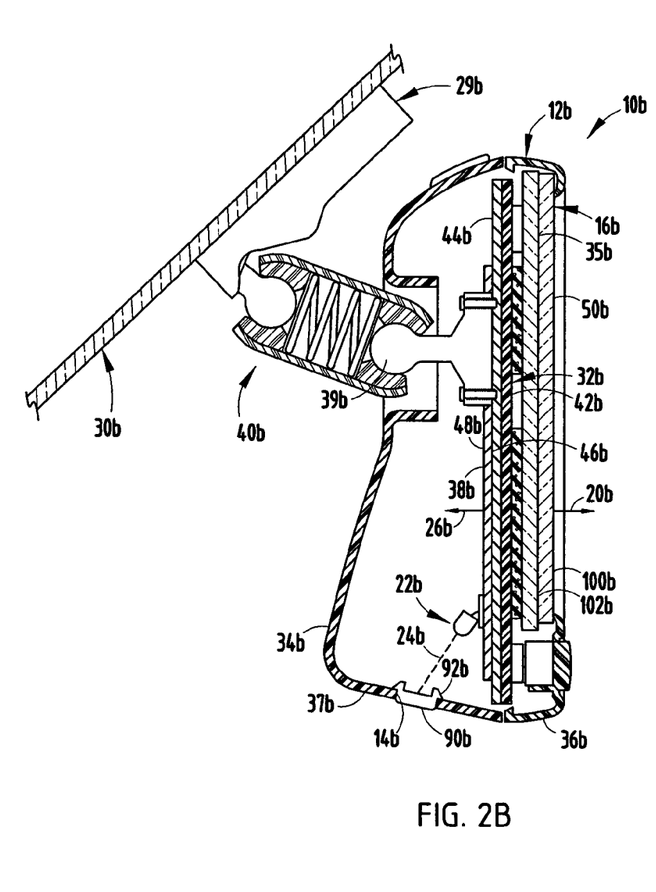
FIG. 2B is a cross-sectional view of an interior rearview mirror of an alternative to the third embodiment of the present invention.

The reference numeral 10b (FIG. 2B) generally designates another embodiment of the present invention, having a third embodiment for the rearview mirror subassembly. Since the third embodiment of the rearview mirror subassembly 10b is similar to the previously described rearview mirror subassembly, similar parts appearing in FIG. 1 and FIG. 2B, respectively, are represented by the same, corresponding reference number, except for the suffix "b" in the numerals of the latter. The third embodiment of the rearview mirror subassembly is substantially identical to the first embodiment of the rearview mirror subassembly, except that the light source 22b is a LED device directly connected to the rear face of the printed circuit board 38b which emits light along the beam axis 24b that is directed towards the bottom opening 14 without being deviated by a deviator. Therefore, the beam axis 24b of the light emitted from the LED device is non-parallel with a line perpendicular to the second side of the printed circuit board 38b (which is parallel to the second direction 26b). The LED device is any device including an LED directly connected to the rear face of the printed circuit board. In the illustrated embodiment, the beam axis 24b of the light emitted from the LED device is substantially perpendicular to the line perpendicular to the second side of the printed circuit board 38b. However, it is contemplated that the LED device could be angled away from the line perpendicular to the second side of the printed circuit board 38b such that bottom opening 14b is not located directly below the LED device (See FIG. 2A)In the illustrated example, a lens 90 could cover the bottom opening 14 in the housing 12 to assist in directing the light out of the bottom opening 14. In the illustrated example, the lens 90 includes a pair of prongs 92 that can snap into the bottom opening 14 to connect the lens 90 to the housing 12. The lens 90 could include a Fresnel or spherical surface and could be a diffuser for spreading the light exiting the bottom opening 14. It is contemplated that the lens 90 could comprise any type of diffuser or could be used to focus light. The lens 90 is preferably made of any non-opaque material and could be transparent or translucent. Moreover, it is contemplated that the lens 90 could be transparent without affecting the light transmitted through the lens 90. Furthermore, it is contemplated that the lens 90 could be integral with the housing.

It is contemplated that the present inventive concepts can be used in combination with mirrors (interior and/or exterior) having many different options to create synergistic and non-obvious combinations that provide surprising and unexpected benefits not previously possible. Therefore, it will be appreciated by those skilled in the art that various other vehicle accessories and components may be incorporated in the previously described rearview mirror subassembly 10 for a vehicle in whole or in part and in various combinations. Such vehicle accessories and components may be mounted within, on or to the housing 12, the mounting bracket 29, attachment to the mirror housing 12 or the mounting bracket 29, or in a console or other housing associated with the interior rearview mirror having the rearview mirror subassembly 10 of the present invention. Additionally, any such vehicle accessories may share components with one another, such as processors, sensors, power supplies, wire harnesses and plugs, displays, switches, antennae, etc. Examples of other vehicle accessories, components or features are described further below.

Figure 3A:
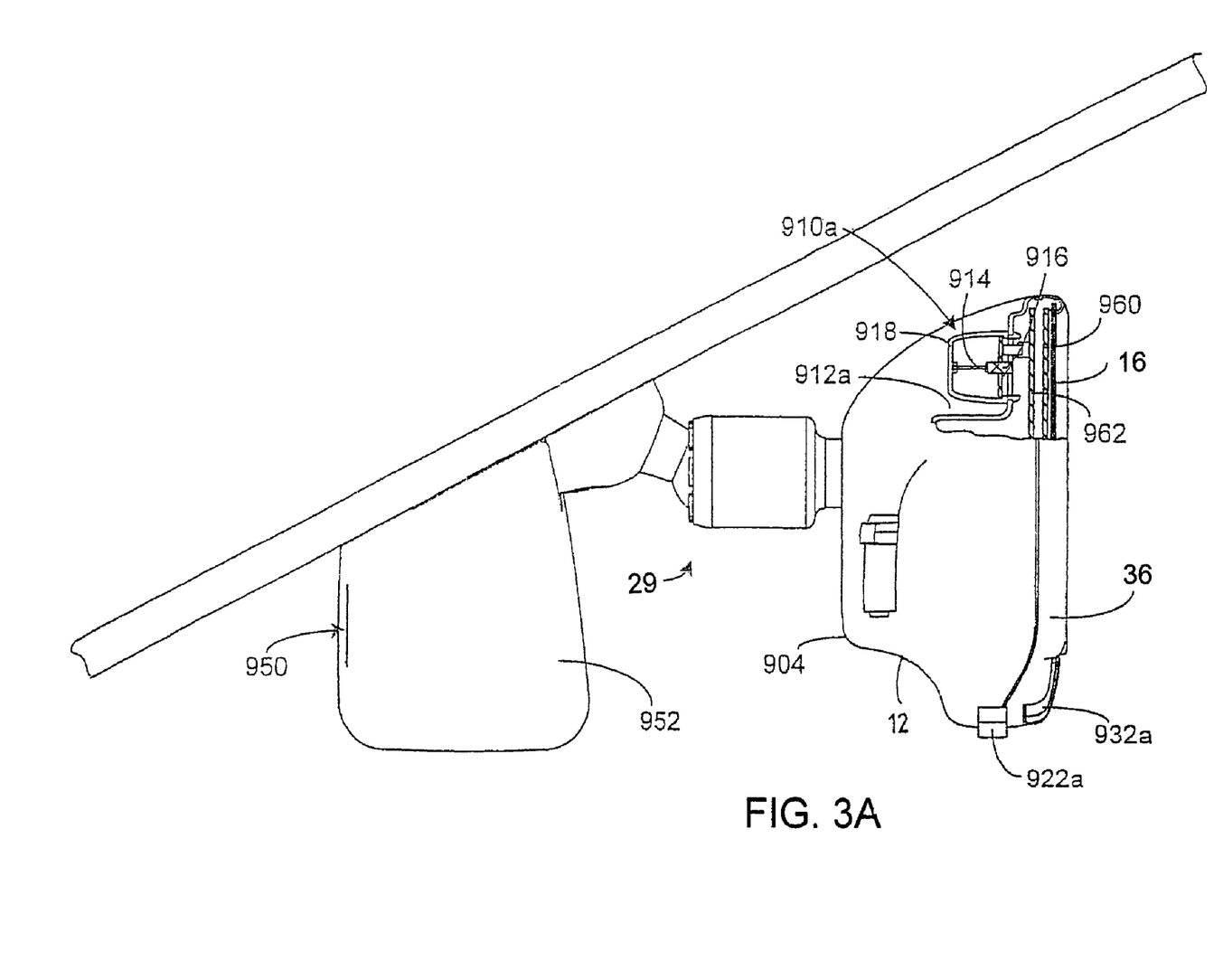
FIG. 3A is an elevational view of the side of the interior rearview mirror system constructed according to the present invention connected to a windshield.
Figure 3B:
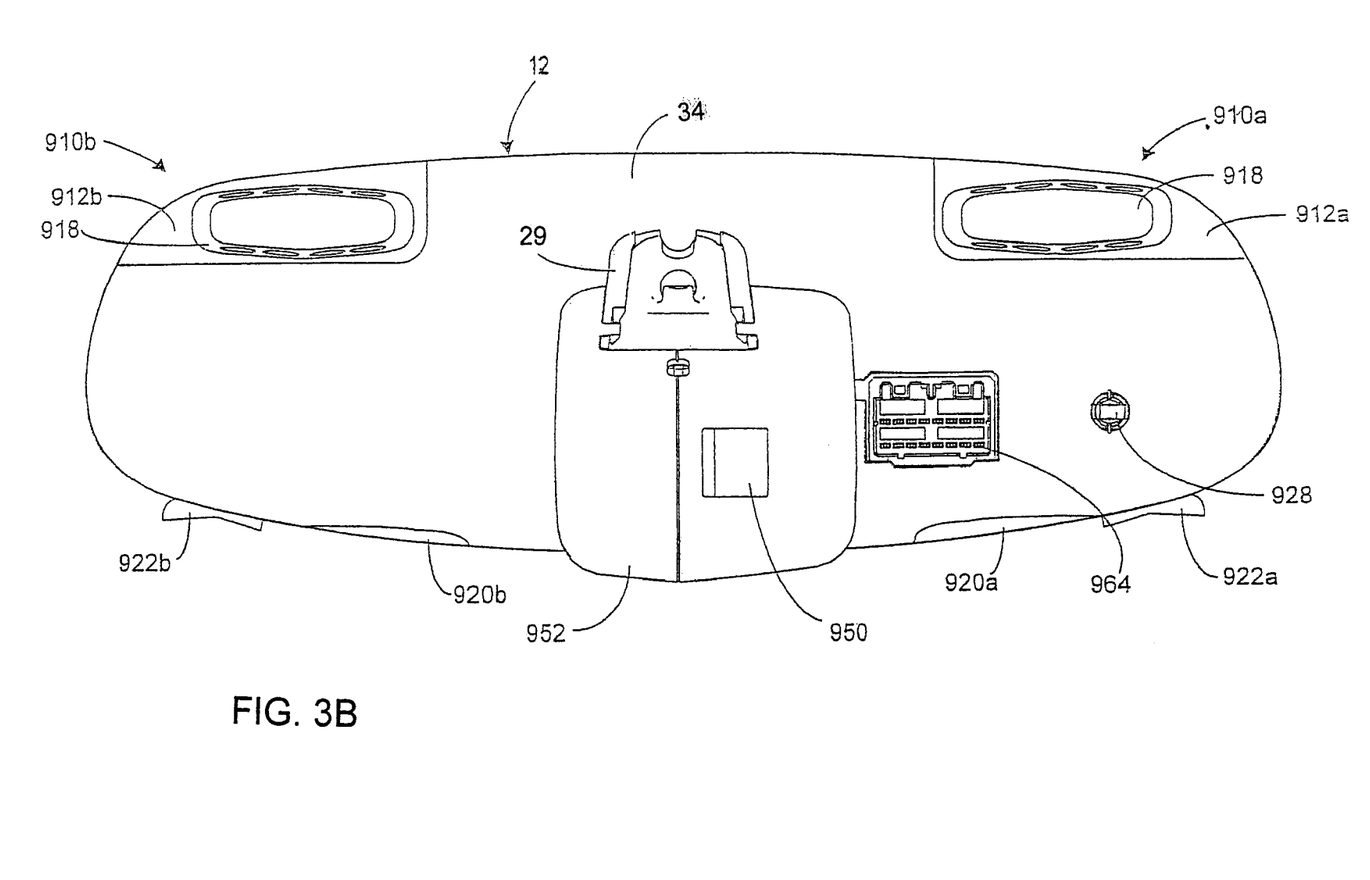
FIG. 3B is an elevational view of the rear of the interior rearview mirror system constructed according to the present invention.
Figure 3C:
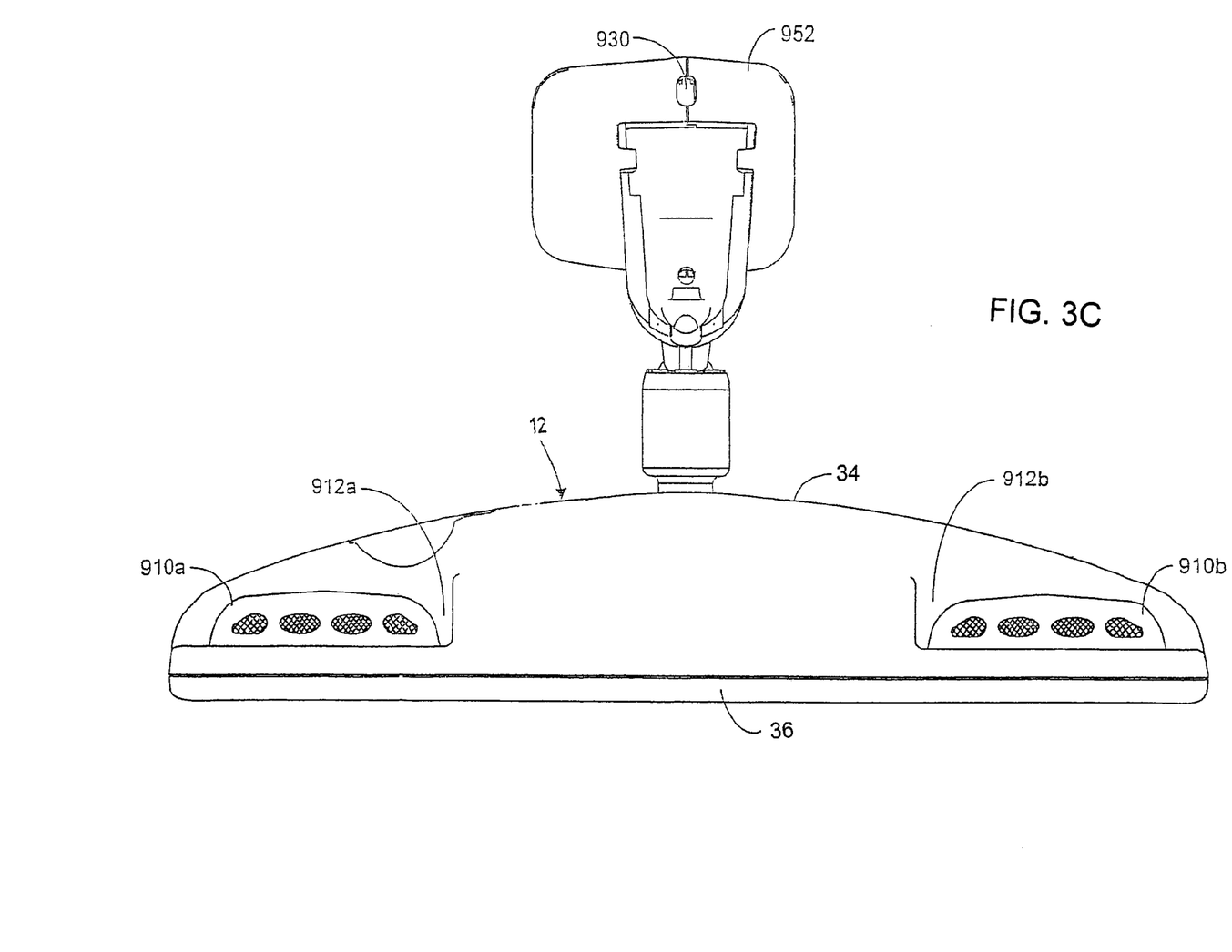
FIG. 3C is a plan view of the top of the interior rearview mirror system constructed according to the present invention.

An example of a system incorporated in the interior rearview mirror includes an electronic compass system within the housing 12 of the interior rearview mirror as described in U.S. Patent Application No. 60/449,828 entitled ELECTRONIC COMPASS SYSTEM, the entire contents of which are incorporated in its entirety herein by reference. FIGS. 3A-3C show another embodiment of the interior rearview mirror in which any of the electronic compass systems described in U.S. Patent Application No. 60/449,828 are incorporated. As illustrated in FIGS. 3A-3C, the housing 12 comprises the bezel 36 and the rear housing section 34. The bezel 36 and the rear housing section 34 combine to define the housing 12 for incorporation of features in addition to a reflective element 16 and information displays 905a and 905b. Commonly assigned U.S. Pat. Nos. 6,102,546, D410,607, 6,407,468, 6,420,800, and 6,471,362, the disclosures of which are incorporated in their entireties herein by reference, describe examples of various bezels, cases and associated button constructions that may be used with the present invention.

Figure 4A:
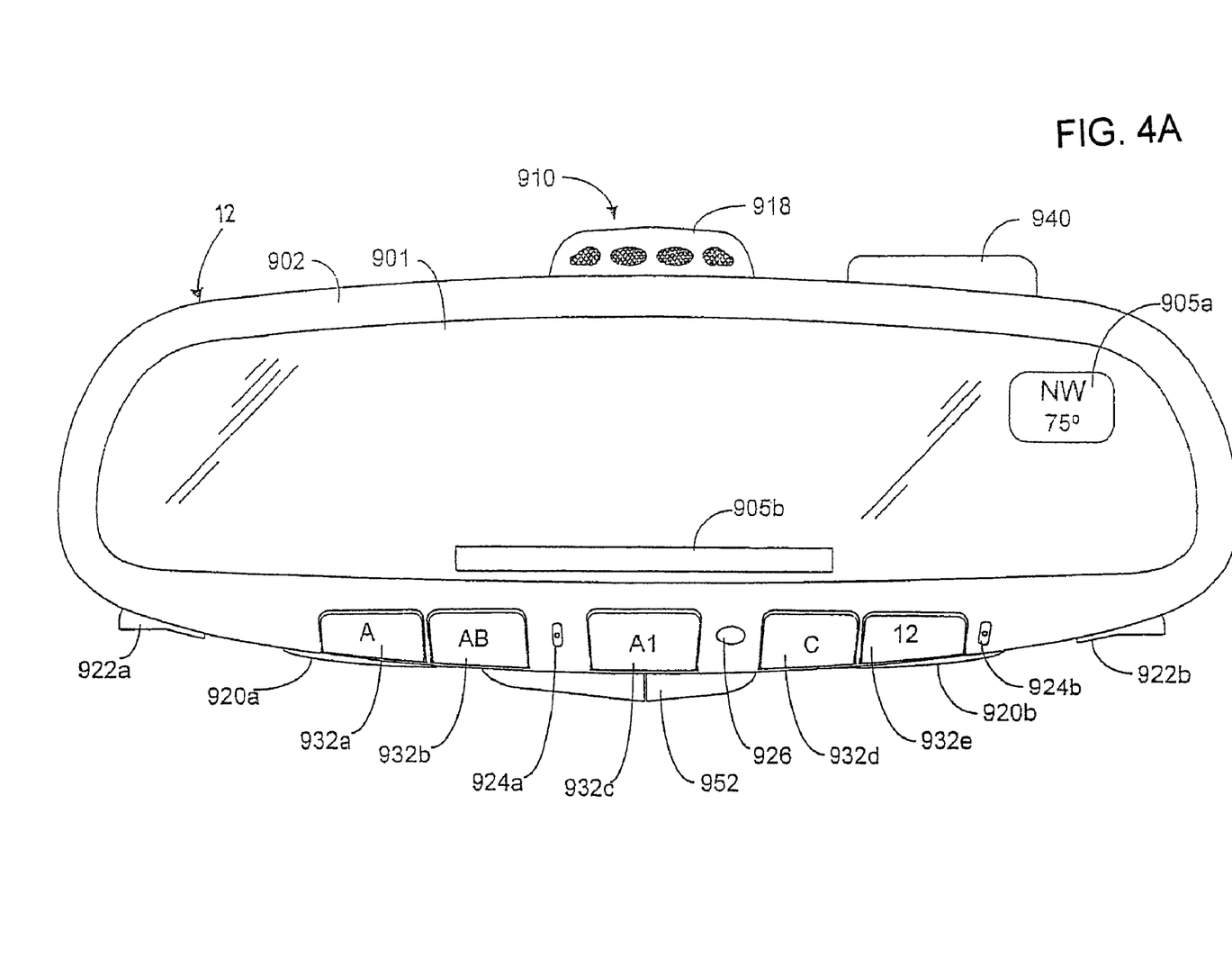
FIG. 4A is an elevational view of the front of the interior rearview mirror system constructed according to the present invention.
Figure 4B:
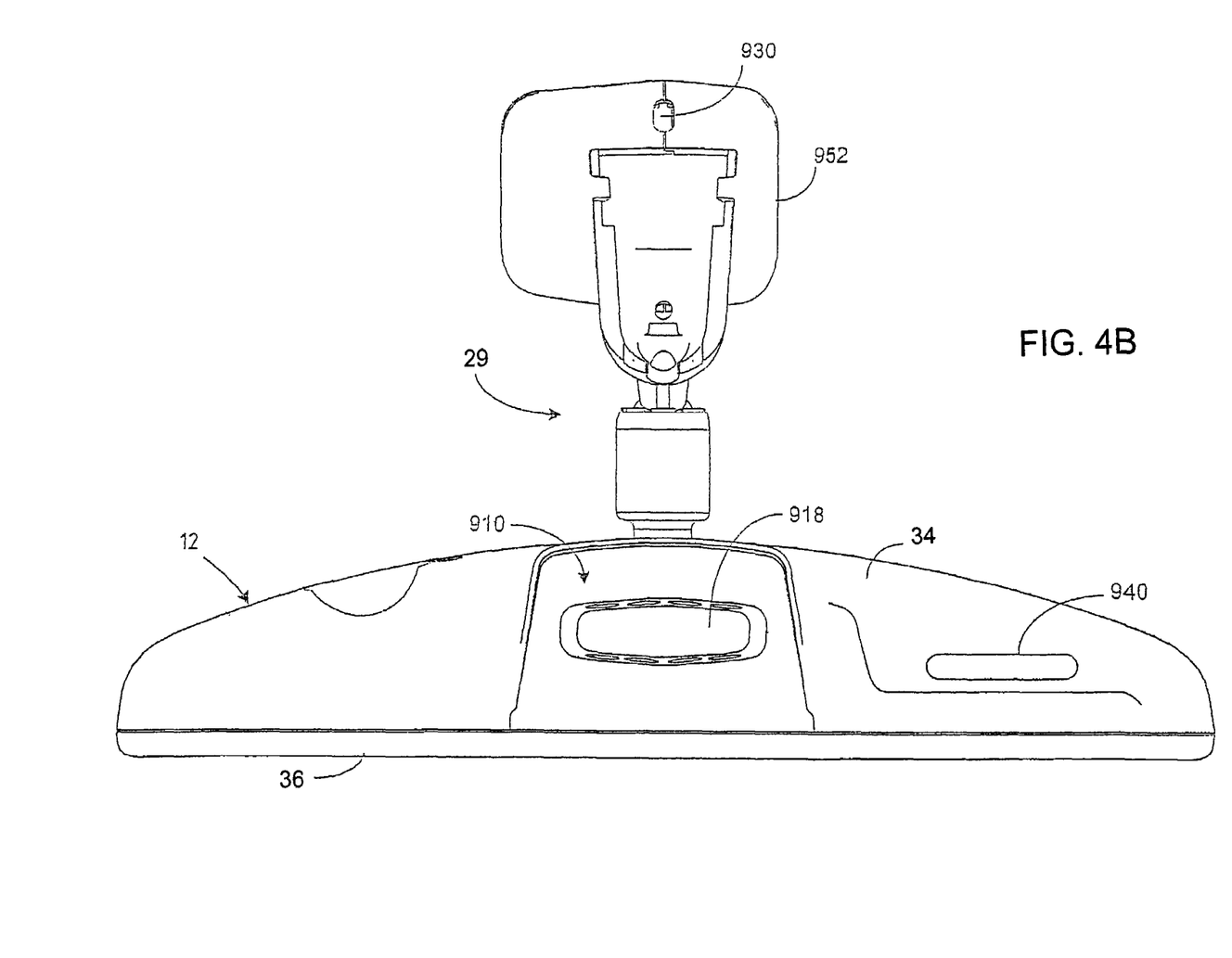
FIG. 4B is a plan view of the top of the interior rearview mirror system constructed according to the present invention.

As depicted in FIGS. 3A-3C, the interior rearview mirror may comprise first and second microphones 910a and 910b. Examples of microphones for use with the present invention are described in commonly assigned U.S. Pat. Nos. 7,120,261, 6,614,911, 6,882,734, and PCT Publication No. WO2003/041285, the disclosures of which are incorporated in their entireties herein by reference. Although the two microphones are shown as being mounted to the backside of rear housing section 34, one or more such microphones may be mounted on the top of the interior rearview mirror (as shown in FIGS. 4A and 4B), on the bottom of the interior rearview mirror, or anywhere within the rear housing section 34 or bezel 36. Preferably, two microphones 910a and 910b are incorporated, one near each end, into the interior rearview mirror on the backside of the rear housing section 34 within recessed portions 912a and 912b. As shown in FIG. 3A, the microphones are constructed with acoustic dam 914 extending around transducer 916 within microphone housing 918. Additional details of this preferred construction are disclosed in commonly assigned International PCT Publication No. WO2003/041285, the entire disclosure of which is incorporated herein by reference. The audio systems including the microphones may be integrated, at least in part, in a common control with information displays and/or may share components with the information displays. In addition, the status of these systems and/or the devices controlled thereby may be displayed on the associated information displays.

As shown in FIGS. 4A and 4B, a single microphone 910 is provided on the top side of the housing 12. In this construction, it is preferable to include two transducers in microphone housing 918 in a manner similar to that disclosed in the above-referenced International PCT Publication No. WO2003/041285 and U.S. Pat. No. 6,882,734.

The interior rearview mirror may also include first and second switches 922a and 922b. Suitable switches for use with the present invention are described in detail in commonly assigned U.S. Pat. Nos. 6,407,468, 6,420,800, 6,426,568, and 6,471,362, as well as commonly assigned U.S. Pat. No. 6,614,579, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using the switches.

The interior rearview mirror may also include first and second indicators 924a and 924b. Various indicators for use with the present invention are described in commonly assigned U.S. Pat. Nos. 5,803,579, 6,335,548, 6,441,943, 6,521,916, 6,523,976, 6,670,207 and 6,805,474, as well as commonly assigned U.S. patent application Ser. No. 09/723,675, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

The interior rearview mirror may further include first and second light sensors 926 and 928 serving as glare and ambient sensors, respectively. Preferred light sensors for use within the present invention are described in detail in commonly assigned U.S. Pat. Nos. 5,923,027, 6,313,457, 6,359,274, 6,379,013, 6,402,328, 6,679,608 and 6,831,268, the disclosures of which are incorporated in their entireties herein by reference. The glare sensor 926 and/or ambient sensor 928 automatically control the reflectivity of a self dimming reflective element as well as the intensity of information displays and/or backlighting. The glare sensor 926 may also be used to sense headlights of trailing vehicles and the ambient sensor is used to detect the ambient lighting conditions that the system is operating within. In another embodiment, a sky sensor 930 may be incorporated positioned to detect light levels generally above and in front of associated vehicle. The sky sensor 930 may be used to automatically control the reflectivity of a self-dimming element, the exterior lights of a controlled vehicle and/or the intensity of information displays. The interior rearview mirror may further include sun-load sensors for sensing light levels towards the driver side and passenger side of the vehicle so as to control the climate control system of the vehicle.

Additionally, the interior rearview mirror may include first, second, third, fourth and fifth operator interfaces 932a-932e located in the bezel 36. Each operator interface is shown to comprise a backlit information display "A," "AB," "A1," "49," and "12". It should be understood that these operator interfaces can be incorporated anywhere in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420,800, 6,426,568, 6,471,362 and 6,614,579, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIGS. 3A-3C and 4A and 4B, it should be understood that fewer or more individual devices may be incorporated in any location within the associated vehicle and as described within the references incorporated herein.

A mounting bracket 29 is included for mounting the interior rearview mirror within a vehicle either to the windshield, or to the vehicle roof structure. It should be understood that a host of accessories may be incorporated into the mounting bracket 29 or into a housing 952 attached to the mounting bracket 29 such as a rain sensor (and therefore outside of a periphery of the button), a camera, a headlight control, additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays. An example of a rain sensor in a mounting bracket 18 is disclosed in commonly assigned U.S. Patent Application No. 60/472,017, the entire disclosure of which is incorporated in its entirety herein by reference.

The interior rearview mirror is shown in FIG. 3A to further comprise the circuit board 38 on which the compass sensor module (not shown) may be mounted, and a daughter board 962 with an input/output bus interface (not shown).

The electrical output signal from either, or both, of the sensors 926 and 928 may be used as inputs to a controller (not shown) to control the reflectivity of the reflective element 16 and/or the intensity of any one or all of the displays 905a and 905b. The details of various control circuits for use herewith are described in commonly assigned U.S. Pat. Nos. 5,883,605, 5,956,012, 6,084,700, 6,222,177, 6,244,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module is described as being mounted to circuit board 38, it should be understood that the sensor module may be located within the mounting bracket 29, with an accessory module of the interior rearview mirror or at any location within an associated vehicle such as under a dash board, in an overhead console, a center console, a trunk, an engine compartment, etc. The above described compass systems may be integrated, at least in part, in a common control with information displays and/or may share components with the information displays. In addition, the status of these systems and/or the devices controlled thereby may be displayed on the associated information displays.

The circuit board 38 may comprise a controller (not shown), such as a microprocessor, and the daughter board 962 may comprise an information display 905a. The microprocessor may, for example, receive signal(s) from the compass sensor module and process the signal(s) and transmit signal(s) to the daughter board to the control display 905a to indicate the corresponding vehicle heading. As described herein and within the references incorporated by reference herein, the controller may receive signal(s) from light sensor(s), rain sensor(s), automatic vehicle exterior light controller(s) (not shown), microphone(s), global positioning systems (not shown), telecommunication systems (not shown), operator interface(s) and a host of other devices, and control the information display(s) to provide appropriate visual indications.

The controller (or controllers) used to control the compass system may, at least in part, control the reflectivity of the reflective element 16, exterior lights, the rain sensor, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. The controller 796 (or controllers) may receive signals from switches and/or sensors associated with any of the devices described herein and in the references incorporated by reference herein to automatically manipulate any other device described herein or described in the references included by reference. The controller may be, at least in part, located outside the interior rearview mirror or may comprise a second controller elsewhere in the vehicle or additional controllers throughout the vehicle. The individual processors may be configured to communicate serially, in parallel, via BLUETOOTH™ protocol, wireless communication, over the vehicle bus, over a CAN bus or any other suitable communication. A multi-pin connector interface 964 may be provided for such external connections.

Exterior light control systems as described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, 6,379,013, 6,653,614, 6,611,610, 6,621,616, 6,587,573, 6,861,809 and 6,774,988 and U.S. patent application Ser. Nos. and 60/404,879 and 60/394,583, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 950, may be housed in accessory housing 952 attached to the mount bracket 29.

Moisture sensors and windshield fog detector systems are described in commonly-assigned U.S. Pat. Nos. 5,923,027, 6,313,457, 6,681,163 and 6,617,564, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The interior rearview mirror may further include one or more antennae 940 for receipt and/or transmission of RF signals. Appropriate receiving, transmitting, and/or processing circuitry may further be included in or attached to the interior rearview mirror. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in an interior rearview mirror system are disclosed in commonly assigned U.S. Pat. Nos. 6,215,389 and 6,431,712 and in U.S. Pat. No. 6,861,942 and 6,696,935, the entire disclosures of which are incorporated herein by reference. Examples of a GPS system incorporated in the interior rearview mirror are disclosed in commonly assigned U.S. Pat. Nos. 6,166,698, 6,297,781, 6,396,446, and 6,980,092, the entire disclosures of which are incorporated herein by reference. An example of a LORAN system incorporated in an interior rearview mirror system is disclosed in commonly assigned U.S. Pat. No. 6,539,306, the entire disclosure of which is incorporated herein by reference. An example of both a telephone/telematics system and a BLUETOOTH™ system incorporated in an interior rearview mirror system is disclosed in commonly assigned U.S. Pat. No. 6,980,092, the entire disclosure of which is incorporated herein by reference. Examples of a trainable garage door opening systems and RKE systems incorporated in an interior rearview mirror system are disclosed in U.S. Pat. No. 6,091,183, the entire disclosures of which are incorporated herein by reference.

The interior rearview mirror may further include an infrared (IR) transmitter/receiver for transmitting/receiving information to and from the interior rearview mirror and possibly to and from the vehicle. An example of such an interior rearview mirror system is disclosed in commonly-assigned U.S. Pat. No. 6,407,712, the entire disclosure of which is incorporated herein by reference.

The interior rearview mirror may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly assigned U.S. Pat. No. 6,186,698 may be used, the entire disclosure of which is incorporated herein by reference. Examples of backlit indicia panel displays are disclosed in commonly-assigned U.S. Pat. Nos. 6,170,956, 6,356,376, 6,870,376, 6,870,655 and 6,572,233, the entire disclosures of which are incorporated herein by reference. Various displays used in interior rearview mirror systems are disclosed in commonly assigned U.S. Pat. Nos. 6,356,376 and 6,700,692, the entire disclosures of which are incorporated herein by reference.

The wiring for the vehicle accessories in the interior rearview mirror may be run through the mounting bracket 29 and along the windshield (if the mounting bracket 29 does not already extend to the headliner) under a wire cover 37. An example of an interior rearview mirror system in which the wiring for accessories in the housing 12 are routed through the mounting bracket 29 is disclosed in commonly assigned U.S. Pat. No. 6,467,919, the entire disclosure of which is incorporated herein by reference.

While the present invention has been described as being implemented with the sensors positioned within the housing 12 of the interior rearview mirror, the sensors could be mounted in the mounting foot or in any other location of the interior rearview mirror. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only. Modifications of the invention will occur to those skilled in the art and to those who make or use the invention. For example, the light emitted from the light source could be director by the deviator out of a top, side or rear opening in the housing. Furthermore, the deviator could comprise element that reflects, refracts, or diffracts light. Moreover, while only one light source is illustrated, it is contemplated that the inventive concept as described herein may be duplicated to provide two or more of securing lights, map lights, ambient lights, and/or combinations thereof. Furthermore, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention

We claim:

1. An interior rearview mirror for a vehicle having a front windshield comprising:
    a mounting bracket adapted to be mounted inside the vehicle in a location proximate to or on the front windshield of the vehicle;
    a mirror housing coupled to the mounting bracket;
    a reflective element located within the mirror housing, the reflective element having a front face defining a reflecting plane, the reflective element configured to reflect an image having a reflecting component in a first direction out of the mirror housing; and a light source located within the mirror housing, the light source emitting light along a beam axis, the beam axis having a directional component in a second direction;

wherein the first direction and the second direction are perpendicular to the reflecting plane and the first direction is opposite to the second direction.

2. The interior rearview mirror of claim 1, wherein:
the mirror housing includes a rear housing section and a bezel.

3. The interior rearview mirror of claim 1, wherein:
the mirror housing includes a bottom wall having a bottom opening therein.

4. The interior rearview mirror of claim 3, further including:
a deviator configured to redirect the light emitted from the light source through the bottom opening of the housing.

5. The interior rearview mirror of claim 4, wherein:
the deviator comprises a reflector element.

6. The interior rearview mirror of claim 5, wherein:
the reflector element comprises a mirror.

7. The interior rearview mirror of claim 6, wherein:
the mirror is planar.

8. The interior rearview mirror of claim 5, wherein:
the reflector element is a light pipe.

9. The interior rearview mirror of claim 4, further including:
a lens covering the bottom opening in the housing.

10. The interior rearview mirror of claim 9, wherein:
the lens diffuses light exiting the bottom opening.

11. The interior rearview mirror of claim 1, wherein:
the reflective element comprises an electrochromic mirror subassembly including a front glass element and a rear glass element, with electrochromic material located between the front glass element and the rear glass element.

12. The interior rearview mirror of claim 1, wherein:
the light source comprises a LED.

13. The interior rearview mirror of claim 1, further including:
a carrier plate located within the housing, with the carrier plate including a first face and a second face; and
a printed circuit board located adjacent the second face of the carrier plate, with the printed circuit board including a first side facing the carrier plate and a second side facing away from the carrier plate;
wherein the reflective element is located adjacent the first face of the carrier plate and the light source is connected to the second side of the printed circuit board.

14. The interior rearview mirror of claim 1, wherein:
the reflective element has a reflectance value of about 70 percent or greater.

15. The interior rearview mirror of claim 1, wherein:
the beam axis is angled within about 45% relative to the second direction.

16. The interior rearview mirror of claim 1, wherein:
the beam axis is parallel to the first direction.

17. A rearview mirror subassembly comprising:
a housing having a front opening and a bottom opening:
a reflective element located within the housing, the reflective element configured to reflect light through the front opening;
a light source located within the housing;
a deviator configured to redirect the light emitted from the light source to the bottom opening of the housing; and a lens covering the bottom opening of the housing, the lens diffusing light exiting the bottom opening.

18. The rearview mirror subassembly of claim 17, wherein:
the reflective element has a front face defining a reflecting plane, the reflective element configured to reflect the light having a reflecting component in a first direction through the front opening;
the light source emits light along a beam axis, the beam axis having a directional component in a second direction; and
the first direction and the second direction are perpendicular to the reflecting plane and the first direction is opposite to the second direction.

19. The rearview mirror subassembly of claim 18, wherein:
the beam axis is angled within about 45% relative to the second direction.

20. The rearview mirror subassembly of claim 18, wherein:
the beam axis is parallel to the first direction.

21. The rearview mirror subassembly of claim 17, wherein:
the housing includes a rear housing section and a bezel.

22. The rearview mirror subassembly of claim 17, wherein:
the deviator comprises a reflector element.

23. The rearview mirror subassembly of claim 22, wherein:
the reflector element comprises a mirror.

24. The rearview mirror subassembly of claim 23, wherein:
the mirror is planar.

25. The rearview mirror subassembly of claim 22, wherein:
the reflector element is a light pipe.

26. The rearview mirror subassembly of claim 17, wherein:
the reflective element comprises an electrochromic mirror subassembly including a front glass element and a rear glass element, with electrochromic material located between the front glass element and the rear glass element.

27. The rearview mirror subassembly of claim 17, wherein:
the light source comprises a LED.

28. The rearview mirror subassembly of claim 17, further including:
a carrier plate located within the housing, with the carrier plate including a first face and a second face; and
a printed circuit board located adjacent the second face of the carrier plate, with the printed circuit board including a first side facing the carrier plate and a second side facing away from the carrier plate;
wherein the reflective element is located adjacent the first face of the carrier plate and the light source is connected to the second side of the printed circuit board.

29. The rearview mirror subassembly of claim 17, wherein:
the reflective element has a reflectance value of about 70 percent or greater.

30. A rearview mirror subassembly for a vehicle comprising:
a mirror housing having a bottom opening;
a reflective element located within the mirror housing, the reflective element being configured to reflect an image having a reflecting component in a first direction out of the mirror housing; and
a light source located within the mirror housing, the light source emitting light along a beam axis, the beam axis having a directional component in a second direction; and
a deviator configured to redirect the light emitted from the light source to the bottom opening of the housing;
wherein the first direction and the second direction are parallel and opposite.

31. The rearview mirror subassembly of claim 30, wherein: the mirror housing includes a rear housing section and a bezel.

32. The rearview mirror subassembly of claim 30, wherein: the deviator comprises a reflector element.

33. The rearview mirror subassembly of claim 32, wherein: the reflector element comprises a mirror.

34. The rearview mirror subassembly of claim 33, wherein: the mirror is planar.

35. The rearview mirror subassembly of claim 32, wherein: the reflector element is a light pipe.

36. The rearview mirror subassembly of claim 30, further including:
a lens covering the bottom opening in the housing.

37. The rearview mirror subassembly of claim 36, wherein: the lens diffuses light exiting the bottom opening.

38. The rearview mirror subassembly of claim 30, wherein: the reflective element comprises an electrochromic mirror subassembly including a front glass element and a rear glass element, with electrochromic material located between the front glass element and the rear glass element.

39. The rearview mirror subassembly of claim 30, wherein: the light source comprises a LED.

40. The rearview mirror subassembly of claim 30, further including:
a carrier plate located within the housing, with the carrier plate including a first face and a second face; and
a printed circuit board located adjacent the second face of the carrier plate, with the printed circuit board including a first side facing the carrier plate and a second side facing away from the carrier plate;
wherein the reflective element is located adjacent the first face of the carrier plate and the light source is connected to the second side of the printed circuit board.

41. The rearview mirror subassembly of claim 30, wherein: the reflective element has a reflectance value of about 70 percent or greater.

42. The rearview mirror subassembly of claim 30, wherein: the beam axis is angled within about 45% relative to the second direction.

43. The rearview mirror subassembly of claim 30, wherein: the beam axis is parallel to the first direction.

44. A rearview mirror subassembly comprising:
a housing having a front opening in a front wall of the housing and a bottom opening in a bottom wall of the housing:
a reflective element located within the housing, the reflective element having a front face configured to reflect light through the front opening and a rear face;
a printed circuit board including a first side facing towards the reflective element and a second side facing away from the reflective element;
a LED device directly connected to the second side of the printed circuit board;
wherein light from the LED device exits the housing through the bottom opening in the housing.

45. The rearview mirror subassembly of claim 44, wherein: the LED device emits light along a beam axis; and
the beam axis of the light emitted from the LED device is non-parallel with a line perpendicular to the second side of the printed circuit board.

46. The rearview mirror subassembly of claim 45, wherein: the beam axis of the light emitted from the LED device is substantially perpendicular to the line perpendicular to the second side of the printed circuit board.

47. The rearview mirror subassembly of claim 44, wherein: the housing includes a rear housing section and a bezel.

48. The rearview mirror subassembly of claim 44, further including:
a lens covering the bottom opening in the housing.

49. The rearview mirror subassembly of claim 48, wherein: the lens diffuses light exiting the bottom opening.

50. The rearview mirror subassembly of claim 44, wherein: the reflective element comprises an electrochromic mirror subassembly including a front glass element and a rear glass element, with electrochromic material located between the front glass element and the rear glass element.

51. The rearview mirror subassembly of claim 44, further including:
a carrier plate located between the reflective element and the printed circuit board.

52. The rearview mirror subassembly of claim 44, wherein: the reflective element has a reflectance value of about 70 percent or greater.

53. The rearview mirror subassembly of claim 44, further including:
a deviator configured to redirect the light emitted from the LED device through the bottom opening of the housing.

54. The rearview mirror subassembly of claim 53, wherein: the front face of the reflective element defines a reflecting plane;
the reflective element is configured to reflect light having a reflecting component in a first direction through the front opening;
the LED device emits light along a beam axis;
the beam axis has a directional component in a second direction; and
the first direction and the second direction are perpendicular to the reflecting plane and the first direction is opposite to the second direction.

55. The rearview mirror subassembly of claim 54, wherein: the beam axis is angled within about 45% relative to the second direction.

56. The rearview mirror subassembly of claim 54, wherein: the beam axis is parallel to the first direction.

57. The rearview mirror subassembly of claim 53, wherein: the deviator comprises a reflector element.

58. The rearview mirror subassembly of claim 57, wherein: the reflector element comprises a mirror.

59. The rearview mirror subassembly of claim 58, wherein: the mirror is planar.

60. The rearview mirror subassembly of claim 57, wherein: the reflector element is a light pipe.

* * * * *

UNITED STATES PATENT AND TRADEMARK OFFICE
CERTIFICATE OF CORRECTION

PATENT NO. : 7,488,099 B2  Page 1 of 1
APPLICATION NO. : 10/826047
DATED : February 10, 2009
INVENTOR(S) : Jeremy A. Fogg et al.

It is certified that error appears in the above-identified patent and that said Letters Patent is hereby corrected as shown below:

Title Page; should read;
<u>Face of Patent</u>
(*) Notice:  Subject to any disclaimer, the term of this patent is extended or adjusted under 35 U.S.C. 154(b) by 198 days.

Signed and Sealed this

Fifth Day of May, 2009

JOHN DOLL
*Acting Director of the United States Patent and Trademark Office*